July 17, 1934.   L. F. SCHUHMACHER   1,966,465
MAT
Filed Sept. 19, 1932
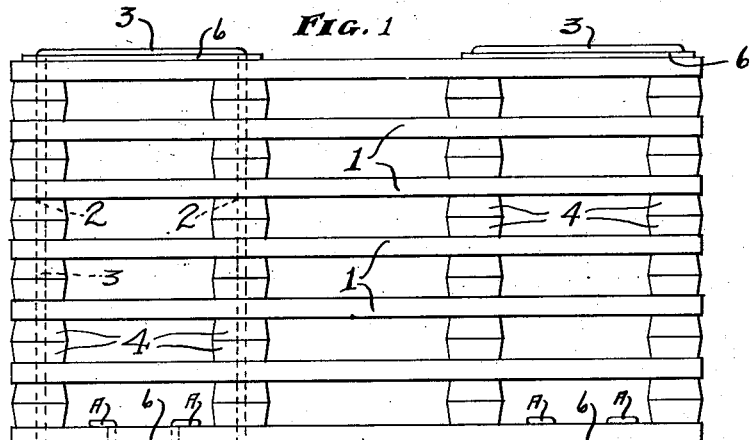
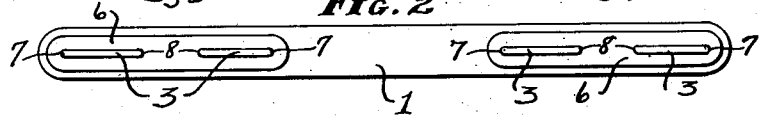
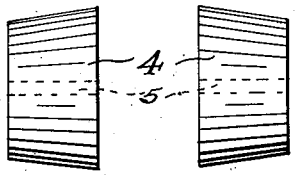 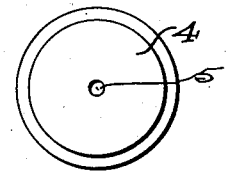
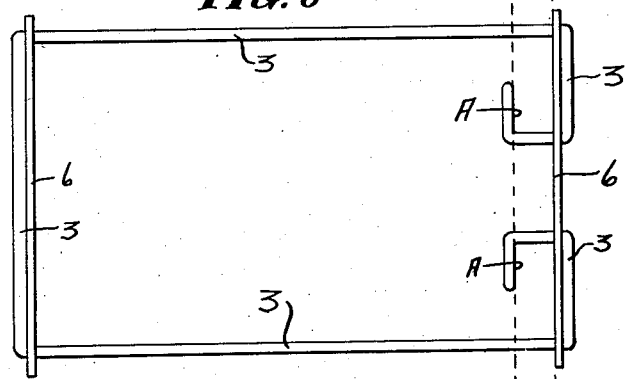
INVENTOR.
Lawrence F. Schuhmacher
BY
ATTORNEY.

Patented July 17, 1934

1,966,465

UNITED STATES PATENT OFFICE 1,966,465

MAT

Lawrence F. Schuhmacher, Meade, Kans., assignor to Schuhmacher and Schneider Patents, Inc., Chicago, Ill., a corporation of Illinois Application September 19, 1932, Serial No. 633,722

1 Claim. (Cl. 20—78)

My invention relates to improvements in mats.

The object of my invention is to construct a mat of salvaged automobile tires.

A further object of my invention is to cut strips from the tire longitudinally to acquire uniformity of thickness from one end of the strip to the other.

A still further object of my invention is to position the strips on edge and in parallelism to each other and spaced apart with spacing elements cut from the same class of material and made two ply for uniformity as the inclination of the die is to cut each member conical in form.

A still further object of my invention is to distribute the spacing means in alignment in pairs transverse to the strips longitudinally, and a U-shaped bar of a single piece of wire to connect the same firmly together.

A still further object of my invention is to provide a metal plate for each of the outside strips to form a bearing for the wire to avoid mutilation of the strip under the required tension of the wire.

A still further object of my invention is to conceal each end portion of the wire for a smooth external finish along the sides of the mat, and also a locking means for its ends of the wire against withdrawal.

These and other objects will hereinafter be more fully explained, reference being had to the accompanying drawing forming a part of this specification, and in which like characters will apply to like parts in the different views.

Referring to the drawing:—

Fig. 1 is a plan view of a mat reduced in size.

Fig. 2 is a side view showing the lock of the wires.

Fig. 3 is a view of the other side showing the U-shaped bend of the wire.

Fig. 4 is an enlarged exploded detail view of one of the spacers.

Fig. 5 is an end view of Fig. 4.

Fig. 6 is an enlarged detail view of the wire formation and plates positioned thereon at each end.

To construct a mat of the class herein disclosed, I salvage an automobile tire that has been well worn and cut the same in narrow strips longitudinally of the tire and then determine the length of the mat desired cutting the strips uniformly in length placing the same on edge as shown in Fig. 1. The strips are apertured in pairs as shown at 2 and being in registry and aligned transversely to the strips of the mat and thru which a U-shaped wire 3 will engage to align the strips and bind the same together but separated by spacers 4 that are assembled in pairs, each member being frusto-conical and cylindrical in form. The conical shape being formed by the die intersecting with the large end and is compressed expanding the opposite side while cutting thru the sheet and when released the spacer becomes conical by the contraction of the compressed side which is merely a freak action. I take advantage of the same by placing the enlarged ends together, the diameter of which is equal to the width of the strips. Therefore, the makeup of the mat as a whole is quite uniform in appearance. It will be understood that the said spacers are apertured axially as at 5 to receive the wire passing therethru.

A bearing plate 6 is arranged to engage on the outside of each of the outside strips of the mat and having apertures 7 in each end thereof thru which the said looped wire will engage. The apertures are in registry with the pairs of apertures thru the strips, by which means a greater area of bearing is obtained on the outside strips to avoid mutilation when the said wires are tensioned and locked by bending the ends at right angles toward each other. A second bend of each wire passes thru intermediate apertures 8 in one of the plates, the inner ends as at A extending thru the side strip are bent at right angles from each other to engage snugly against the underside of its respective strip member, by which means the mat members are tied firmly toget'er and the ends of the wire concealed to avoid contact therewith. The plates are somewhat narrower than the width of the strips on which they engage to avoid contact with the floor or body on which the mat rests.

While I have shown a mat apparently complete as in Fig. 1, the same is only illustrated to exhibit a complete assembly. Therefore, I do not wish to be restricted to the size as the same may be of greater length and width and of varying proportions with respect to rectangular form as mats may be arranged for stair treads, door steps, and running boards of automobiles, and such other modifications may be employed as lie within the scope of the appended claim.

Having fully described my invention, what I claim as new and desire to secure by Letters Patent is:—

In mats, in combination, a plurality of salvaged tire strips apertured therealong, the apertures of the said strips in registry, a pair of frusto-conical spacing elements of similar salvaged material, each concentrically apertured and placed in pairs with their respective frustum ends abutting the strips as spacing means therefor and being in registry with respect to the apertures of each, a metal plate for one side of the mat having an aperture near each end thereof to register with adjacent apertures in the strips, and another plate for the other side of the mat apertured in like manner to the first said plate and having another aperture in spaced relation from the apertures near the ends thereof, a looped wire spaced to engage thru the end apertures of the plate and the apertures of the strips and separators in registry therewith, the wire extending across the mat and having a right angled bend toward the intermediate apertures of the last said plate, and another right angled bend of the inner end portion of each leg of the wire to engage thru the intermediate apertures and penetrates the adjacent strip as disposing means for the ends of the wire and locking means to the strip securing the strips and spacers firmly together, all substantially as shown.

LAWRENCE F. SCHUHMACHER.